United States Patent [19]

Tarkkanen

[11] 3,957,677

[45] May 18, 1976

[54] COMPOSITION FOR USE IN SCINTILLATOR SYSTEMS

[75] Inventor: Veikko Tarkkanen, Delft, Netherlands

[73] Assignee: Packard Instrument Company, Inc., Downers Grove, Ill.

[22] Filed: Apr. 9, 1973

[21] Appl. No.: 349,550

[30] Foreign Application Priority Data
Apr. 10, 1972 United Kingdom............... 16499/72
Apr. 10, 1972 United Kingdom............... 16500/72

[52] U.S. Cl. .......................................... 252/301.17
[51] Int. Cl............................................... C09k 1/02
[58] Field of Search ............. 252/301.2 SC, 301.2 R

[56] References Cited
UNITED STATES PATENTS
3,429,826  2/1969  Alburger ...................... 260/301.2 P
3,573,219  3/1971  Benson...................... 252/301.2 SC

OTHER PUBLICATIONS

Gaylord Reduction with Complex Metal Hydrides Interscience Publishers, N.Y., 1956.

Primary Examiner—Arthur P. Demers
Attorney, Agent, or Firm—Wolfe, Hubbard, Leydig, Voit & Osann, Ltd.

[57] ABSTRACT

A liquid scintillation counting composition of the type comprising an aromatic hydrocarbon solvent, an ethoxylated alkyl phenol surfactant, and a scintillation solute, contains a small amount of a substituted ethoxylated carboxylate acid and/or a tertiary amine salt or a quaternary ammonium salt of such acid. The free acid reduces chemiluminescence upon the addition of an alkaline sample to the composition, while the tertiary amine or quaternary ammonium salt enhances the water miscibility of the composition.

11 Claims, 2 Drawing Figures

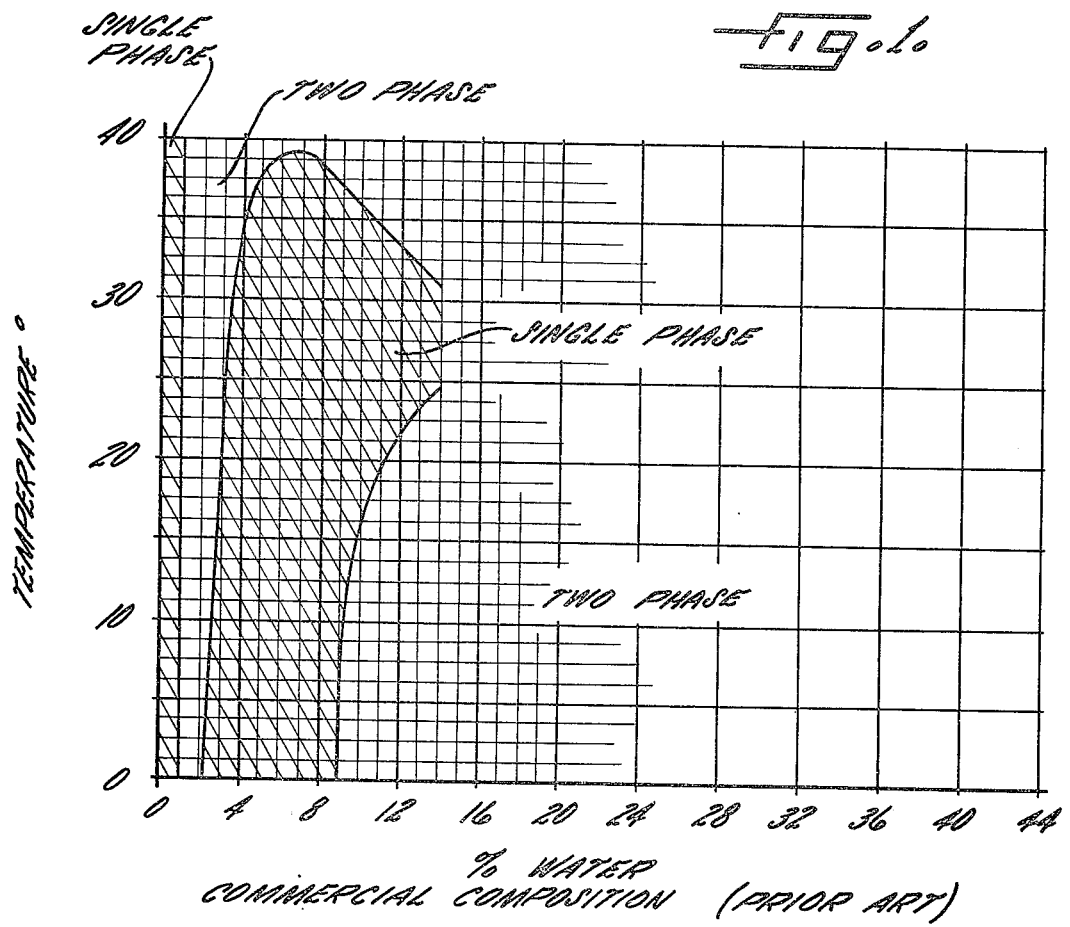
FIG. 1b — Commercial Composition (Prior Art)
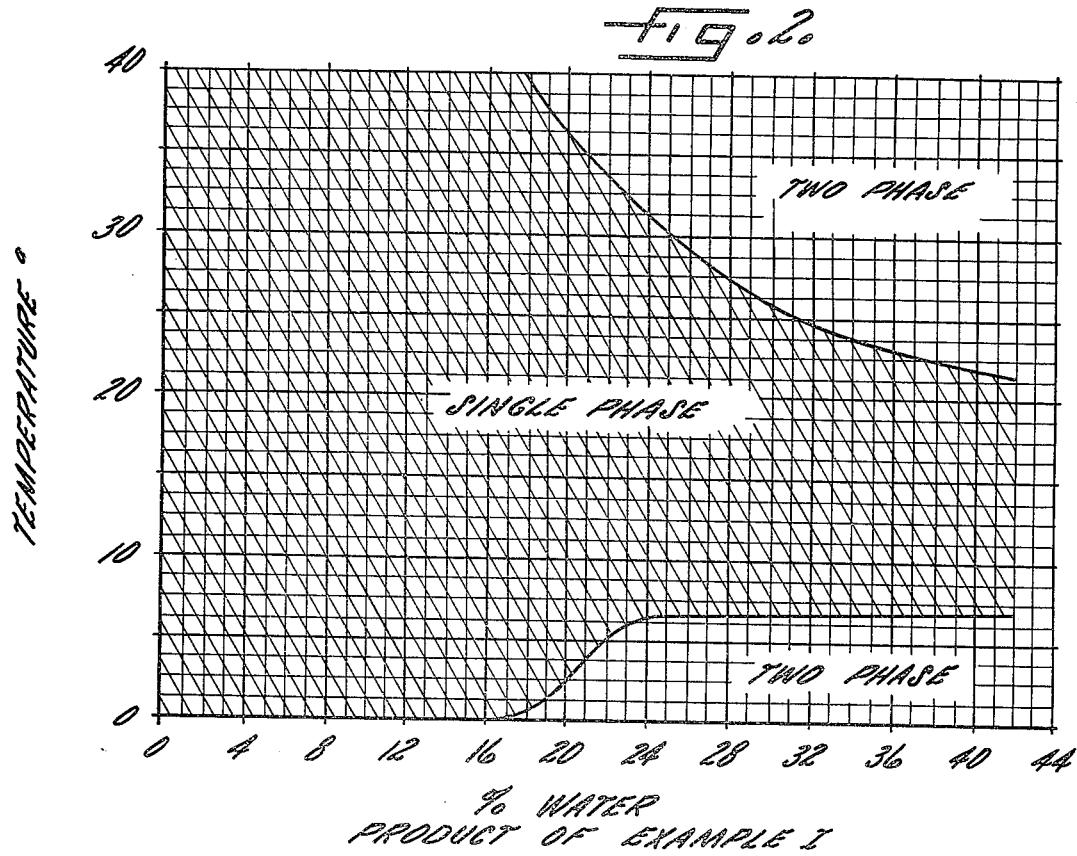
FIG. 2b — Product of Example I

COMPOSITION FOR USE IN SCINTILLATOR SYSTEMS

CROSS-REFERENCES TO RELATED APPLICATIONS

Priority is claimed with respect to British Provisional Specification Application No. 16499/72, filed Apr. 10, 1972, and to No. 16500/72 filed Apr. 10, 1972.

BACKGROUND OF THE INVENTION

This invention relates to liquid scintillation counting compositions, and more particularly concerns compositions for counting aqueous radioactive samples.

The use of liquid scintillation counting systems including an aromatic hydrocarbon solvent, an ethoxylated alkyl phenol surfactant, and a scintillation solute, has become a popular method for counting aqueous radioactive samples. The original sample is dispersed in the scintillation counting composition, and the emitted radioactivity is converted by the scintillation solute to light flashes (fluorescence). These pulses are of an intensity proportional to the energy of the radiation, and occur at a frequency proportional to the disintegrations per unit time occurring in the sample. Instrumental detection, recording, and analysis of the pulses thus affords a measure of the radioactivity of the initial sample.

Inasmuch as the light detector is responsive to light from any source, it is evident that all other illumination must be excluded when the sample is being counted. Thus, if spurious light is produced when the counting composition is mixed with the sample (luminescence) or excited with light or heat (phosphoresence), false pulses are recorded and the analytical result is compromised.

Conventionally, phosphoresence is minimized by counting the sample in the dark and at low temperature, e.g. 6° or 7°C. Luminescence gradually decays, and is commonly minimized by storing the sample for several days before counting. Low temperatures, however, tend to reduce the dissipation rate of chemically induced luminescence (chemiluminescence).

The problem of chemiluminescence is particularly severe with alkaline radioactive samples. Many common sample materials, e.g. body fluids, are inherently alkaline, while other samples such as animal tissues are frequently dissolved in alkaline media. Alkaline chemiluminescence can readily produce a false light count (or background) of over 1.5 million disintegrations per minute (DPM); an acceptable background should not exceed 50 DPM. This background problem is especially serious with biological samples, where the radionuclide emits low energy beta particles, and may have a low absolute activity.

The problem of avoiding chemiluminescence in liquid scintillation counting compositions has received considerable attention. It has been suggested that the composition be pre-treated with an alkaline medium before an alkaline sample is added; this has not proved effective. Alternatively, it has been proposed to include an acid such as hydrochloric acid in the composition to react with any alkaline materials; while effective, this procedure dilutes the sample, introduced additional water, and gives lower counting efficiencies as a result of the presence of acid. Some researchers, believing that chemiluminescence is produced by peroxides, have recommended the inclusion of antioxidants or pre-reduction of peroxides with various chemical reducing agents; antioxidants, however, produce undesirable color formation (color quench), and pre-reduction of peroxides with existing procedures forms gas bubbles and insoluble salts.

Accordingly, one object of the present invention is to provide, for the counting of aqueous radioactive samples, a liquid scintillation counting composition of the aromatic hydrocarbon-ethoxylated alkyl phenol surfactant type, which reduces, if not eliminates, chemiluminescence upon the addition of an alkaline material to the composition.

Also associated with the use of aromatic hydrocarbon-ethoxylated alkyl phenol type scintillation counting compositions is the problem of water miscibility. Ideally, an aqueous sample should mix easily into the aromatic hydrocarbon and ethoxylated alkyl phenol to provide a homogeneous solution or emulsion. In present practice, a single phase clear solution is obtained only up to about 15% water by weight. At higher water concentrations, up to about 25–30%, the mixture forms an unstable two-phase material, while at still higher water contents the product is a viscous gel. (These ranges vary with the specific composition and the specific temperature; the best commercial liquid scintillation counting composition produces two phases at 15–30 weight % water at 21°C, or between 13 and 25% water at 6°C.) Two-phase counting compositions tend to be somewhat unstable with respect to time, while gels are resistive to homogeneous dispersions of the radioactive substances and are unsuitable in flow systems.

Accordingly, another object of the invention is to provide an aromatic hydrocarbon-ethoxylated alkyl phenol type scintillation counting composition which, when admixed with an aqueous sample, produces a single phase, low viscosity, composition over a wide range of water contents and temperatures. Otherwise stated, an objective is to enhance the water miscibility of aromatic hydrocarbon-ethoxylated alkyl phenol type counting compositions.

Other and further aims, objects and advantges of the invention will become apparent as the description thereof proceeds.

BRIEF DESCRIPTION OF THE DRAWINGS

The remarkable effectiveness of compositions according to the invention is partially demonstrated in the drawings, wherein:

FIG. 1 illustrates the narrow range of conditions of temperature and water content within which a commercial aromatic hydrocarbon-ethoxylated alkyl phenol type composition forms a single phase; and FIG. 2 illustrates the wide range of temperatures and water contents which form a single phase in a liquid scintillation counting composition according to the invention.

SUMMARY OF THE INVENTION

Briefly, and in accordance with the invention, ingredients are added to aromatic hydrocarbon-ethoxylated alkyl phenol surfactant type liquid scintillation counting compositions which materially reduce the chemiluminescence upon the addition of an alkaline material and/or which enhance the water miscibility of the composition. Chemiluminescence is reduced or eliminated by including in the composition a substituted ethoxylated carboxylic acid in which the substituent is an alkoxy group of about 5 to 24 carbon atoms or an alkyl phenoxy group in which the alkyl is of about 8–16C atoms, and in which the ethoxy groups are from about 3 to 12 and the carboxylic acid is the residue of acetic or a propionic acid. Water miscibility is improved by employing tertiary amine salts or quaternary ammonium salts of the previously-identified substituted ethoxylated carboxylic acid, and is optionally enhanced even further by including a quaternary ammonium halide.

Aromatic hydrocarbon-ethoxylated alkyl phenol type liquid scintillation counting compositions according to the invention are thus able to accommodate large concentrations of water (and thereby large concentrations of radionuclides) and tolerate the high alkalinity of body fluid samples or solubilized tissue samples.

In further keeping with the invention, peroxides are removed (an additional peroxide formation is inhibited) from the mixture of aromatic hydrocarbon and ethoxylated alkyl phenol surfactant (before addition of other ingredients) by treatment with a metal hydride, optimally followed by the addition of sulfur dioxide gas, both of which are more fully described below.

AROMATIC HYDROCARBON SOLVENT

The solvents generally found to be useful in preparing the compositions of the present invention are the liquid aromatic hydrocarbons. Non-limiting examples of the later include benzene, toluene, o-, m-, p-xylenes and mixtures thereof, cumene, the ethylbenzenes and mesitylene. In particular, xylene, toluene and ethylbenzene have been found to give the highest counting efficiency. Especially preferred solvents are the xylenes, i.e., the ortho, meta or para isomers either alone or mixed.

ETHOXYLATED ALKYL PHENOL SURFACTANTS

A wide variety of ethoxylated alkyl phenol surfactants may be employed in the preparation of liquid scintillation counting compositions according to the invention. These materials, variously known as alkyl phenol polyethylene glycol ethers or by other sundry names, are the addition products of an alkyl phenol and ethylene oxide. Conventionally, the materials are defined with reference to the particular identity of the alkyl group, the location of the alkyl group relative to the hydroxy group on the phenol (e.g., o, m, or p), and the average number of ethylene oxide groups per molecule.

Numerous ethoxylated alkyl phenol surfactants are available commercially. Many have been tested for their effectiveness as liquid scintillation counting ingredients by Lieberman et al., "Low-Level Counting by Liquid Scintillation", *International Jour. Appl. Rad. and Isotopes*, 1970, Vol. 21, pages 319–327, and by Benson in U.S. Pat. Nos. 3,573,218, 3,573,219, 3,573,220, etc. Benson reported that optimal counting efficiency is attained with ethoxylated alkyl phenols in which the alkyl substituent contains from 7 to 16 carbon atoms and the ratio of the number of carbon atoms in the alkyl substituent to the average number of ethoxy groups is from about 0.8 to about 1.7, particularly 0.83 to 1.67. The preparation, identification, and commercial availability of ethoxylated alkyl phenols is described, for example, in Kirk-Othmer's "Encyclopedia of Chemical Technology," Second Edition, Volume 19, Surfactants, especially pages 531–536, and in Schwartz et al., "Surface Active Agents and Detergents", Volume II, especially pages 125–127.

The ethoxylated alkyl phenol, or mixture of ethoxylated alkyl phenols, is desirably present in a minor amount by weight or volume of the liquid scintillation counting composition. The preferred volume ratio of surfactant to aromatic hydrocarbon solvent is in the range of about 1:1 to about 1:3, and in the Examples herein, on a weight basis, the surfactant constitutes about 20–40 weight per cent of the entire scintillation counting composition.

SCINTILLATION SOLUTE

The scintillation solutes which may be used in the composition of the present invention are those which are well known in the art and the present invention is not to be construed as limited to the use of any particular scintillation solute. These scintillation solutes may be comprised of only a fluor or may also contain a secondary solute such as a spectrum shifter or waveband shifter. The scintillation solute may also contain for some purposes a neutron-capture solute or a gamma-capture solute. Some of the more well-known fluors which are useful in the present invention are those selected from the group consisting of p-terphenyl, the oxazoles and the oxadiazoles. Probably, the best known oxadiazole fluor is PBD[2-(4-biphenylyl)-5-phenyl-1,3,4-oxadiazole] and the most well-known oxazole fluor is PPO[2,5-diphenyloxazole]. Some of the better known secondary solutes which may be combined with the foregoing primary solutes are POPOP[1,4-bis-2-(5-phenyloxyazolyl)-benzene], alpha-NOPON[p-bis-2-(5-1-naphthyloxyazolyl)-benzene], DPH[1,6 -diphenyl-1,3,5-hexatriene], and alpha-NPO[2,(1-naphthyl) -5-phenyloxazole]. Another scintillation solute which has been mentioned in the prior art is m-terphenyl phus 0.5% anthracene. The scintillation solutes need only be present in amounts sufficient to enable the compositions of the present invention to be useful as liquid scintillators. The optimum amount will vary according to the particular component or components making up the scintillation solute and the amount will generaly be a balance between cost, solubility, and performance requirements. The scintillation solute will generally be present in amounts of from 0.5 to 50 grams per liter but more often will be present in amounts from 1 to 12 grams per liter. It is especially preferred that the liquid scintillators of the present invention contain about 4 to 6 grams per liter of scintillation solute. When speaking of only primary solutes or fluors, these are generally present in amounts of about 0.5 to 12 grams per liter. Secondary solutes are generally present in relatively small amounts as compared to the fluors, that is, from about 0.05 to 3 grams per liter. The preferred scintillation solute of the present invention is comprised of PPO and POPOP.

SUBSTITUTED ETHOXYLATED CARBOXYLIC ACID

In accordance with one aspect of the invention, the liquid scintillation counting composition contains a small amount of a substituted ethoxylated carboxylic acid. When it is desired to reduce chemiluminescence, the free acid form is optimal, whereas for enhancing water miscibility of the scintillation composition, a tertiary amine salt or a quaternary ammonium salt of the acid is preferred.

Substituted ethoxylated carboxylic acids are compounds having three constituent moieties, namely an alkoxy or an alkyl phenoxy group, a chain of ethoxy groups, and the residue of a lower carboxylic acid, particularly acetic or alpha or beta propionic acid. In the case of alkoxy groups, the group may be straight or branched chain and have about 5–24, preferably about 7–18, C atoms per molecule, whereas for an alkyl phenoxy group the alkyl desirably has about 8–16 C atoms. The preferred number of ethoxy groups per molecule is from about 3–12, optimally about 3–5.

The substituted ethoxylated carboxylic acids are preferably employed in relatively small amounts, e.g., about 1–10 weight per cent on the total liquid scintillation counting composition, although the optimal amount depends largely on selection of other components of the composition and on the desired water tolerance. For enhancing the water tolerance, or miscibility, and as set forth below, all or part of the substituted ethoxylated carboxylic acid is advantageously in the form of a tertiary amine salt or a quaternary ammonium salt, which salt is prepared simply by mixing the acid and a tertiary amine or a quaternary ammonium hydroxide (or alkoxide), as the case may be, into the composition. Stoichiometry dictates the relative amounts of amine and substituted ethoxylated carboxylic acid; the reaction is equimolar, but an excess (3:1 to 1:3 molar ratio) of either may be desired under particular circumstances. Thus, excess free carboxylic acid is maintained when severe chemiluminescence is likely to be encountered, while excess of the tertiary amine or the quaternary ammonium compound not only enhances water miscibility but serves as a strong base to facilitate the dissolving of organic tissue.

AMINES

Tertiary amines and quaternary ammonium hydroxides (or equivalent alkoxide) serve a multiple function in liquid scintillation counting compositions. When present in their free forms they establish an alkaline medium for dissolving animal and other organic tissue, while when combined as a salt of a substituted ethoxylated carboxylic acid they materially enhance the water miscibility of aromatic hydrocarbon-ethoxylated alkyl phenol type compositions. Apparently this latter effect is in part due to the provision of a unique salt-type co-emulsifying agent having a strongly hydrophilic and ionic function in a central portion, as opposed to a terminal portion, of the emulsifier. To this end, the tertiary amine or the quaternary ammonium hydroxide (or methoxide) desirably has at least one methyl group and one or two alkyl groups of substantially longer carbon atom length, e.g. about 6–18 C atoms; the fourth group in the quaternary compound is desirably methyl, ethyl, or benzyl. These requirements are not indispensable, as quaternary ammonium compounds of excellent suitability are outside the preferred description above.

If the amine is a tertiary amine, it is preferable that it have one or two methyl groups so as to avoid the possibility of steric hindrance. The remaining group or groups on the nitrogen atom is (are) advantageously a straight chain alkyl. In the case of a monomethyl amine, the alkyl groups desirably have 8–16 C atoms; for a dimethyl amine the other alkyl desirably has 10–18 C atoms, e.g. 14.

Representative quaternary ammonium hydroxides of the type having at least one methyl group and at least one long chain hydrocarbon (or substituted hydrocarbon group) are listed in, for example, "Liquid Scintillation Counting" (Pergamon 1958), particularly the articles by Bell and by Radin, and in Hansen et al. U.S. Pat. No. 3,506,828. Quaternary ammonium hydroxides preferably have two methyl groups and two straight chain alkyls of 8–16, preferably 12, C atoms each. Other quaternary ammonium hydroxides include the Hyamines, particularly Hyamine 10-X.

The quaternary ammonium hydroxides are usually prepared from the corresponding halide by reaction with silver oxide or hydroxide in an alcoholic medium, according to known techniques.

QUATERNARY AMMONIUM HALIDE

An optional, though highly desirable, ingredient for the liquid scintillation counting composition is a quaternary ammonium halide, usually employed in a small amount, e.g. 1–10 weight per cent, but nonetheless effective to enhance the water miscibility of the final composition.

The quaternary ammonium halides thus employed may either be the same or different halides as employed for the preparation of quaternary ammonium hydroxide. Advantageously, however, the halides have one methyl group and three long chain (straight or branched) alkyl groups of typically about 7–18 C atoms. Chlorides are preferred by reason of economies.

PEROXIDE REMOVAL WITH METAL HYDRIDE

To reduce the chemiluminescence of aromatic hydrocarbon-ethoxylated alkyl phenol surfactant type liquid scintillation counting compositions, it has been found highly advantageous to treat the mixture of aromatic hydrocarbon and ethoxylated alkyl phenol with a reactive solid metal hydride. Apparently the hydride effectively decomposes peroxides which may be present, as well as assisting in maintaining the color-free quality and purity of the scintillation counting composition.

Treatment with a metal hydride is desirably effected before addition of any substituted ethoxylated carboxylic acid, any amine, any quaternary ammonium halide, or any scintillation solute, each of which may be reactive with the hydride. Accordingly, the aromatic hydrocarbon and the ethoxylated alkyl phenol are admixed together with the solid metal hydride, preferably in finely dispersed form, for a period desirably ranging from about one to about forty minutes, and at a temperature of from 10°C. to about 30°C. An oxygen-free environment is advantageous. Following this treatment the hydride is filtered or otherwise physically removed from the solution, and the remainder of the ingredients added.

Suitable reactive solid metal hydrides include those listed in Kirk-Othmer's "Encyclopedia of Chemical Technology", Second Edition, Volume 11, especially pages 210–222, and include the alkali metal borohydrides and the alkali metal aluminohydrides, e.g. sodium borohydride and lithium aluminohydride.

PEROXIDE REMOVAL WITH $SO_2$

It has also been discovered that reacting the ethoxylated alkyl phenol surfactant and aromatic hydrocarbon with sulfur dioxide. This is effected subsequent to metal hydride treatment (and separation) and prior to the addition of any of the other ingredients which may be reactive with $SO_2$.

Only a small amount of SO₂ is needed, e.g., 2–4 g. SO₂ per 1,000 liters of solution, to react with remaining peroxides. Merely introducing the SO₂ as a gas at room temperature agitating the mixture and purging with air provides a stable color-free solution.

EXAMPLES

Various embodiments of the invention are set forth below, and illustrate the various features of the invention.

EXAMPLE I

This Example illustrates the preparation of a liquid scintillation counting composition containing a quaternary ammonium salt of a substituted ethoxylated carboxylic acid, together with a quaternary ammonium halide.

The composition is as set forth below:

| Parts, by wt. | Component |
| --- | --- |
| 19 | Ethoxylated nonylphenol, 8 EO |
| 5 | Ethoxylated nonylphenyl, 7 EO |
| 2 | Dodecanol polyethoxy acetic acid, 4 EO |
| 3 | Undecyl-dodecyl-dimethylammonium hydroxide, 0.6 M. in toluene |
| 4 | Tridecyl methylammonium chloride |
| 1 | Scintillator mixture<br>7 Parts 2,5-diphenyloxazole<br>3 Parts para-, bis-(orthomethylstyryl) benzene |
| 67 | m-Xylene |
| 100 | |

Each of the foregoing components is mixed, at room temperature, into a stirred mixing flask, whereupon the mixture is ready for use.

The water miscibility of the product of this Example is indicated in FIG. II. When mixed with up to about 34% water, the liquid scintillation counting composition maintains a single, homogeneous, transparent, low-viscosity phase which is both stable and imminently usable within a temperature range from about +7° to about +24°C.

The contrast between the performance of the product of this Example with a typical commercial liquid scintillation counting composition (FIG. I) is manifest.

EXAMPLE II

This Example illustrates the preparation of a liquid scintillation counting composition containing a quaternary ammonium salt of a substituted ethoxylated carboxylic acid.

The composition is prepared from the following components, in the manner employed for Example I.

| Parts, by wt. | Component |
| --- | --- |
| 22 | Ethoxylated nonylphenol, 8.0 EO |
| 6 | Ethoxylated nonylphenol, 7.0 EO |
| 3 | Dodecanol polyethoxy acetic acid, 4 EO |
| 3 | Undecyl-dodecyl-dimethylammonium hydroxide, 0.6 M in toluene |
| 5 | Tridecyl methylammonium chloride |
| 1 | Scintillator mixture<br>7 Parts 2,5-diphenyloxazole (PPO)<br>3 Parts para-, bis-(orthomethylstyryl) benzene, (bis-MSB) |
| 60 | m-Xylene |
| 100 | |

EXAMPLE III

This Example illustrates the preparation of a liquid scintillation counting composition utilizing a substituted ethoxylated carboxylic acid, but without a quaternary ammonium-affording moiety.

The composition is prepared from the components below, in the manner employed for Example I.

| Kg. | Component |
| --- | --- |
| 34.1 | Ethoxylated nonylphenol, 10.5 EO (Akyporox NP 105) |
| 7.46 | Dodecanol polyethoxy acetic acid, 4 EO (Akypo LM 54) |
| 0.78 | PPO |
| 0.128 | bis-MSB |
| 57.54 | m-Xylene |
| 100.008 Kg. (106.5 L.) | |

The composition of this Example has a density at 25°C. of about 0.93–0.94 g/ml.

EXAMPLE IV

This Example illustrates the preparation of a liquid scintillation counting composition employing a quaternary ammonium salt of a substituted ethoxylated carboxylic acid.

The composition is as follows:

| Kg. | Component |
| --- | --- |
| 22.96 | Ethoxylated nonylphenol, 8.0 EO (PB-2) |
| 6.94 | Ethoxylated nonylphenol, 7.0 EO (Akyporox NP 70) |
| 3.20 | Tetradecanol polyethoxy acetic acid, 4.5 EO (Akypo LM 52 BG) |
| 8.01 | Trioctylmethylammonium hydroxide, 0.5 N. in toluene |
| 1.08 | PPO |
| 0.126 | bis-MSB |
| 57.97 | m-Xylene |
| 100.286 Kg. (107.8 L.) | |

The composition, prepared as described for Example I, has a density at 25°C. of 0.92–0.93 g/ml.

EXAMPLE V

This Example illustrates the preparation of a liquid scintillation counting composition employing a substituted ethoxylated carboxylic acid and metal hydride pre-treatment of the aromatic hydrocarbon solvent and the ethoxylated alkyl phenol surfactant.

The composition is as follows:

| Parts, by wt. | Component |
| --- | --- |
| 36 | Ethoxylated nonylphenol, 11.0 EO |
| 9 | Dodecanol polyethoxy acetic acid, 4 EO |
| 1 | Scintillator mixture<br>7 Parts 2,5-diphenyloxazole<br>3 Parts para-, bis-(orthomethylstyryl) benzene |
| 54 | m-Xylene |
| 100 | |

Before mixing, the ethoxylated nonylphenol and the xylene are mixed together with sodium borohydride, using approximately % by weight of borohydride and maintaining agitation for about one half hour. After removing the borohydride the emulsifier-aromatic solvent system is mixed with the scintillator mixture and with the dodecanol polyethoxy acetic acid.

EXAMPLE VI

This Example illustrates the preparation of a liquid scintillation counting composition employing a substituted ethoxylated carboxylic acid.

The ingredients indicated below are admixed according to the procedure of Example I.

| Kg. | Component |
|---|---|
| 21.0 | Ethoxylated alkylphenol (Triton N-101) |
| 14.0 | Ethoxylated alkylphenol (Triton X-114) |
| 1.0 | Nonylphenol polyethoxy acetic acid, 8.0 EO (SAPA-8) |
| 0.6 | PPO |
| 0.14 | bis-MSB |
| (to 100 liters) | 1:1 (wt.) p-m-Xylene |
| (100 L.) | |

EXAMPLE VII

This Example illustrates the preparation of a liquid scintillation counting composition containing the substituted ethoxylated carboxylic acid.

The ingredients listed below are admixed according to the procedure of Example I.

| Parts, by wt. | Component |
|---|---|
| 18 | Ethoxylated nonylphenol, 8.0 EO (PB-2) |
| 12 | Ethoxylated alkylphenol (Triton N-12) |
| 2 | Nonylphenol polyethoxy propionic acid, 6 EO |
| 1 | 4,4'''-bis'(butyloctyloxy) quaterphenyl |
| 27 | p-Xylene |
| 40 | m-Xylene |
| 100 | |

EFFECTIVENESS FOR REDUCING CHEMILUMINESCENCE

To illustrate the effectiveness of a composition containing a substituted ethoxylated carboxylic acid for reducing chemiluminescence upon the addition of an alkaline material, the following experiment is conducted.

First, a good-quality "reference" ethoxylated alkyl phenol scintillation counting composition lacking a substituted ethoxylated carboxylic acid is prepared. Its composition is as follows:

| "Reference" Ethoxylated Alkylphenol Scintillator | |
|---|---|
| Parts, by wt. | Component |
| 380.00 | Ethoxylated nonylphenol, 9.0 EO (PB-1, or Tergitol TP-9) |
| 6.96 | PPO |
| 1.22 | bis-MSB |
| 276.00 | p-Xylene |
| 276.00 | m-Xylene |
| 940.28 | |

Then, several test "systems" are employed to generate chemiluminescence corresponding to that produced when an alkaline material—either an alkaline sample or a sample dissolved in an alkaline solvent—is added to the scintillation counting composition. In each system the same amount of an alkaline material, namely 6% of a 21% toluene solution of undecyl-dodecyl-dimethylammonium hydroxide, is added.

Four different systems are used. As shown in the table below, System "A" is the reference ethoxylated alkyl phenol scintillation counting composition; System "B" is a conventional dioxane-naphthalene scintillation counting composition; System "C" is the reference ethoxylated alkyl phenol scintillator plus 10% of 2 M. aqueous hydrochloric acid; and System "D" is a scintillator of Example VI.

| System | Parts, by wt. | Experimental Systems Component |
|---|---|---|
| A | 94 | Reference ethoxylated alkylphenol scintillator |
| | 6 | Undecyl - dodecyl - dimethylammonium hydroxide soln., 21% in toluene |
| B | 94 | 72% dioxane, 10% naphthalene* |
| | 6 | Undecyl-dodecyl-dimethylammonium hydroxide soln., 21% in toluene |
| C | 84 | Reference ethoxylated alkylphenol scintillator |
| | 10 | 2 M. aqueous hydrochloric acid |
| | 6 | Undecyl-dodecyl-dimethylammonium hydroxide soln. 21% in toluene |
| D | 94 | Scintillator of Example V |
| | 6 | Undecyl-dodecyl-dimethylammonium hydroxide soln., 21% in toluene |

The samples in each System are then placed in a scintillation counting device, and the background chemiluminescence, in apparent disintegrations per minute, detected at three different times, namely initial, after 30 minutes, and after 17 hours.

The results are shown in the table below:

| System | Background Chemiluminescence, D.P.M. | | | Relative LSC |
|---|---|---|---|---|
| | Initial | After 30 min. | After 17 hrs. | Efficiency, % |
| A | 9,000,000 | 2,800,000 | 12,000 | 85 |
| B | 4,000,000 | 96,000 | 800 | 50 |
| C | 90,000 | 1,500 | 60 | 75 |
| D | 25,000 to 200 | 24 | 24 | 100 |

| * Naphthalene | 100.0 | grams |
|---|---|---|
| PPO | 5.0 | grams |
| Dimethyl POPOP | 0.3 | grams |

-continued

| System | Background Chemiluminescence, D.P.M. | | | Relative LSC |
|---|---|---|---|---|
| | Initial | After 30 min. | After 17 hrs. | Efficiency, % |
| Dioxane | 720.0 | milliliters | | |
| Toluene | 135.0 | milliliters | | |
| Absolute methanol | 45.0 | milliliters | | |

Relative liquid scintillation counting (LSC) efficiency is determined by adding to each system an aliquot (5.0 microliter per 20 cc. counting vial) of NBS standard tritiated water (1.0 microcuric/ml.), determining the activity (less background count), and expressing the LSC efficiency of each counted system as a percentage relative to 100% for the system that exhibited the highest count rate.

EFFECTIVENESS FOR REDUCING CHEMILUMINESCENCE - B

This set of experiments illustrates the slow decay of alkaline-induced chemiluminescence at a variety of storage temperatures, and compares the results with the absence of such chemiluminescence for a product of the invention (Example V).

In each instance, 1.0 cc. of a 0.62 N. dodecyl decyl dimethylammonium hydroxide solution is used as the alkali. Alkali is added to the scintillator, and the resulting system then stored for specified time periods at one of three temperatures (−10°C, +20°C, and +40°C), and finally counted at +8°C. Inasmuch as no radionuclides are present, the only count recorded is due to chemiluminescence and background.

System E consists of 10.0 cc. of a standard scintillator comprised of 5.0 g. PPO and 0.25 g. dimethyl POP in 1.0 liter toluene with no surfactants, plus 1.0 cc. of alkali. System F is 10.0 cc. of Example V material, plus 1.0 cc. of alkali.

| System | Temperature | Initial | Apparent Count (DPM) After Storage | | | |
|---|---|---|---|---|---|---|
| | | | 1 hr. | 2 hr. | 3 hr. | 4 hr. |
| E | −10°C | 300 | 340 | 150 | 115 | 100 |
| | +20 | 1400 | 90 | 82 | 75 | 70 |
| | +40 | 3000 | 48 | 42 | 40 | 34 |
| F | −10 | 15 | 15 | 15 | 15 | 15 |
| | +20 | 15 | 15 | 15 | 15 | 15 |
| | +40 | 15 | 15 | 15 | 15 | 15 |

EFFECTIVENESS FOR REDUCING CHEMILUMINESCENCE - C

This series illustrates the effectiveness of a composition according to the invention (Example V), as compared with the "reference" ethoxylated alkylphenol scintillator described earlier, for reducing alkali-induced chemiluminescence.

For both systems—G being the reference, H being the Example V material—2.0 cc. of 0.62 N. dodecyl decyl dimethylammonium hydroxide solution is added to 10.0 cc. of the scintillation counting composition, and the resulting compositions then counted at different times. The following results are obtained:

| System | Initial | Apparent Count (DPM) After Storage | | | |
|---|---|---|---|---|---|
| | | 20 min. | 40 min. | 60 min. | 80 min. |
| G (reference) | — | 90,000 | 43,000 | 28,000 | 18,000 |
| H (Example V) | 7500 | 63 | 40 | 31 | 27 |

EFFECTIVENESS FOR REDUCING CHEMILUMINESCENCE - D

This series is essentially a repetition of the previous one, except that the alkali is 2.0 cc. of blood plasma, a natural alkaline material.

The following results are obtained:

| System | Initial | Apparent Count (DPM) After Storage | | |
|---|---|---|---|---|
| | | 20 min. | 40 min. | 50 min. |
| J (reference) | 200 | 110 | 58 | 45 |
| K (Example V) | 16 | 16 | 16 | 16 |

VISCOSITY AS A FUNCTION OF WATER CONTENT

To demonstrate the ability of the present compositions to mix with water without forming viscous gels, tests are conducted in which viscosities are determined for a series of samples with various water contents. The product of Example IV is compared with the previously-described reference ethoxylated alkylphenol scintillator.

| Temperature: 20 C Water, % | Viscosity, centistokes | |
|---|---|---|
| | Reference | Example IV |
| 0 | 3.97 | 4.22 |
| 10 | 19.01 | 10.29 |
| 15 | 55.43 | |
| 20 | 19,780.00 | 20.54 |
| 30 | | 32.22 |
| 40 | | 100.19 |
| 50 | | 443.86 |

What is claimed is:

1. In a liquid scintillation counting composition suitable for aqueous samples, said composition including
   a major amount of an aromatic hydrocarbon solvent,
   a minor amount of an ethoxylated alkyl phenol surfactant,
   and a scintillation solute,
   the improvement comprising the inclusion in said composition of at least one of:
   a. a small amount, effective to reduce chemiluminescence upon the addition of an alkaline material to said composition, of a substituted ethoxylated carboxylic acid wherein said substituent is an alkoxy group of about 5–24 C atoms or an alkyl phenoxy group wherein said alkyl is of about 8–16 atoms, wherein said ethoxy groups are from about 3–12, and wherein said carboxylic acid is the residue of acetic or a propionic acid, and b. a small amount, effective to enhance the water miscibility of said composition, of a tertiary amine salt of said substituted ethoxylated carboxylic acid or a quaternary ammonium salt of said substituted ethoxylated carboxylic acid.

2. Composition of claim 1 wherein said composition includes a substituted ethoxylated carboxylic acid.

3. Composition of claim 1 wherein said composition includes a tertiary amine salt of said substituted ethoxylated carboxylic acid.

4. Composition of claim 1 wherein said composition includes a quaternary ammonium salt of said substituted ethoxylated carboxylic acid.

5. Composition of claim 1 wherein said substituent is an alkoxy group of about 7–18 C atoms.

6. Composition of claim 1 including a small amount, effective to enhance the water miscibility of said composition, of a quaternary ammonium halide.

7. Composition of claim 1 wherein said tertiary amine salt of said substituted ethoxylated carboxylic acid, or said quaternary ammonium salt of said substituted ethoxylated carboxylic acid, has at least one methyl group and at least one alkyl group of about 4–18 C atoms.

8. Composition of claim 1 wherein said ethoxylated alkyl phenol surfactant has an alkyl group of about 7–16 C atoms and the ratio of the number of C atoms in said alkyl substituent to the average number of ethoxy groups in said ethoxylated alkyl phenol is about 0.8–1.7.

9. Composition of claim 1 wherein said aromatic hydrocarbon solvent and said ethoxylated alkyl phenol surfactant are pre-treated with a reactive solid metal hydride for peroxide removal.

10. Composition of claim 9 wherein said pretreated aromatic hydrocarbon solvent and said ethoxylated alkyl phenol surfactant are thereafter pre-treated with $SO_2$ for additional peroxide removal.

11. A method of reducing chemiluminescence of a liquid scintillation counting composition of the type comprising a major amount of an aromatic hydrocarbon solvent and a minor amount of an ethoxylated alkyl phenol surfactant, which comprises treating said solvent and said surfactant with a reactive solid metal hydride for peroxide removal, and after metal hydride treatment, treating said solvent and said surfactant with $SO_2$ for additional peroxide removal.

* * * * *